(No Model.)
C. F. POND.
APPARATUS FOR TEACHING THE PIANO, &c.
No. 539,191. Patented May 14, 1895.
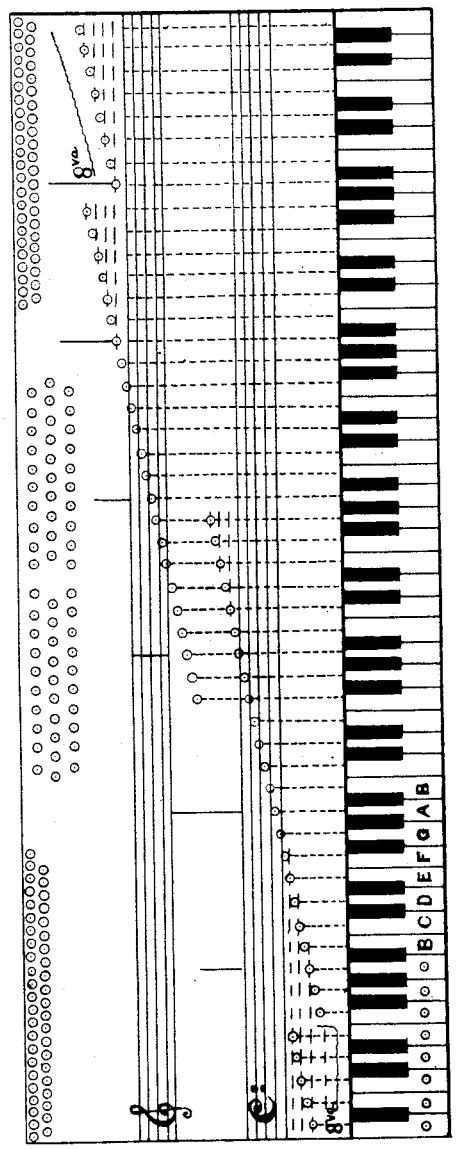
FIG:1.
FIG:2.
FIG:3.
WITNESSES
INVENTOR
Charles Frederic Pond

UNITED STATES PATENT OFFICE.

CHARLES FREDERIC POND, OF ST. ALBANS, ENGLAND.

APPARATUS FOR TEACHING THE PIANO, &c.

SPECIFICATION forming part of Letters Patent No. 539,191, dated May 14, 1895.

Application filed September 13, 1894. Serial No. 522,887. (No model.) Patented in England January 8, 1891, No. 379.

*To all whom it may concern:*

Be it known that I, CHARLES FREDERIC POND, artist, a subject of the Queen of Great Britain, residing at St. Albans, in the county of Hertford, England, have invented Improvements in Means and Apparatus for Teaching the Piano, Organ, or other Like Keyed Musical Instruments, (for which I have obtained the grant of Letters Patent in Great Britain, No. 379, dated January 8, 1891,) of which the following is a specification.

This invention relates to improvements in means or apparatus to facilitate the teaching of the piano, organ, and other like keyed musical instruments.

According to my present invention I represent on a board (of wood, card-board or other suitable material) the black and white keys of a piano which may be pierced with holes or lettered. At a convenient distance above I represent the staves of five lines for the bass clef and five lines for the treble clef and also some or all of the leger lines. These lines and the spaces between them are pierced with holes for the purpose of receiving pegs. Such pegs may have one of the letters A B C D E F or G marked on the head or may be left plain or may have any sign used in music marked thereon in any suitable manner.

The object of the foregoing arrangement is that a pupil may take a peg with the letter C for instance and place it in the hole in the center key C of the board and then take another peg marked C and place it in the corresponding C on the staff. The pupil may then proceed in a similar manner to take pegs and place them (according to the letters marked thereon respectively) on the remaining notes D E F G A B of the keys and of the staff.

Pegs may be made and used to indicate notes of different value from a demisemiquaver to a semibreve inclusively and all or any of the various rests and other signs used in music.

In order that my present invention may be fully understood and readily carried into practice I will proceed to further describe same with reference to the drawings hereunto annexed.

Figure 1 is a plan of my apparatus, showing the black and white keys of a piano pierced with holes or lettered and the bass and treble clefs, with leger-lines, placed at a convenient distance above. The small circles represent the holes for receiving the pegs. A few only of the keys are marked with circles representing the peg-holes; while a few are marked with letters, but it will be readily understood that the whole of the keys are so formed or marked one way or the other in practice. The black keys may also have holes or be lettered. The circles at the top of the board represent holes in which pegs are to be placed, and are arranged so as to be within convenient reach of the pupil. Figs. 2 and 3 represent a peg with the letter C marked thereon, as an example; but any sign or character used in music may be shown in a similar way.

A convenient method of teaching by the use of my invention is for the pupil to take a peg with the letter C for instance and place it in the hole in the center key C on the board and then take a second peg marked C and place it in the corresponding C on the staff proceeding in a similar manner for the entire series.

Having thus described my invention, what I claim as new, and desire to secure by Letters Patent of the United States, is—

1. An apparatus for teaching the piano, organ or other like keyed musical-instrument, consisting of a suitable board or block having the representation of a piano key-board on one part thereof, and a representation of a musical staff above such key-board, said staff being provided with a series of holes, and pegs adapted to be inserted in said holes, substantially as set forth.

2. An apparatus for teaching the piano, organ or other like keyed musical-instrument, consisting of a suitable board or block having a representation of a piano key-board on one part thereof, and a representation of a musical staff above such key-board, said board or block being provided with a series of holes arranged in said musical staff, and with a second independent series of holes, and pegs adapted to be inserted in said holes, substantially as set forth.

CHARLES FREDERIC POND.

Witnesses:
HENRY BIRKBECK,
GEORGE WILLIAM KEY.